(12) United States Patent
Zywiak et al.

(10) Patent No.: US 7,380,408 B2
(45) Date of Patent: Jun. 3, 2008

(54) INTEGRATED CONTROL SYSTEM FOR COMBINED GALLEY REFRIGERATION UNIT AND CABIN AIR CONDITIONING SYSTEM

(75) Inventors: Thomas Zywiak, Suffield, CT (US); Diane Drew, Farmington, CT (US)

(73) Assignee: Hamilton Sunstrand Corporation, Windsor Loccks ( * ) Notice: Subject to any disclaimer, the term of this patent is extended or adjusted under 35 U.S.C. 154(b) by 373 days.

(21) Appl. No.: 11/312,137

(22) Filed: Dec. 20, 2005

(65) Prior Publication Data

US 2007/0137234 A1    Jun. 21, 2007

(51) Int. Cl.
*B60H 1/32*    (2006.01)

(52) U.S. Cl. .............................. 62/244; 62/434; 62/435

(58) Field of Classification Search ................... 62/239, 62/244, 185, 430–439
See application file for complete search history.

(56) References Cited

U.S. PATENT DOCUMENTS

| | | | |
|---|---|---|---|
| 5,491,979 A | * | 2/1996 | Kull et al. ..................... 62/185 |
| 5,513,500 A | * | 5/1996 | Fischer et al. ................. 62/239 |
| 6,880,351 B2 | * | 4/2005 | Simadiris et al. ............. 62/185 |
| 6,973,799 B2 | * | 12/2005 | Kuehl et al. ................... 62/244 |
| 7,024,874 B2 | * | 4/2006 | Zywiak et al. ................. 62/199 |
| 7,093,458 B2 | * | 8/2006 | Hu ............................... 62/435 |
| 7,231,778 B2 | * | 6/2007 | Rigney et al. ................. 62/407 |

* cited by examiner

*Primary Examiner*—William E Tapolcai
(74) *Attorney, Agent, or Firm*—Carlson, Gaskey & Olds

(57) ABSTRACT

An aircraft is provided with an integrated galley refrigeration unit and vehicle cabin air conditioning packet. A control selectively determines whether the provision of cooled air into an air cooled galley takes precedent over the provision of cooled air into the passenger cabin. Valving is provided to selectively provide cold fluid to a recirculation air heat exchanger, which supplies supplemental cooled air for delivery into the passenger cabin. This refrigeration air heat exchanger is utilized when precedent is given to providing cooled air to the cabin. On the other hand, the valve is maintained in an off position when it is determined that the air cooled galleys should take precedent.

16 Claims, 1 Drawing Sheet

INTEGRATED CONTROL SYSTEM FOR COMBINED GALLEY REFRIGERATION UNIT AND CABIN AIR CONDITIONING SYSTEM

BACKGROUND OF THE INVENTION

This application relates to a control and method for controlling a galley refrigeration unit for aircraft food galleys, and an air conditioning unit for supplying air to an aircraft cabin, where both of the units are controlled to provide the most efficient operation.

Aircrafts are provided with a number of subsystems. In the aircraft passenger cabin, the temperature of the air is controlled by an air conditioning pack. This air conditioning pack supplies air to the cabin at a temperature as desired. The load on the air conditioning pack will vary with ambient temperature. As is known, when the aircraft is at altitude, the ambient temperature is often quite cold, and the air conditioning pack must be able to heat the air. At other times, the air conditioning pack must be able of cooling the air delivered to the cabin.

In addition, aircrafts are provided with galleys to store food for the passengers. The food must be kept at refrigeration temperatures for a period of time. Thus, the galleys are typically provided with a refrigeration unit. The loads on the galley refrigeration unit, and the load on the air conditioning pack are not constant. Thus, both units are made larger than may be necessary.

SUMMARY OF THE INVENTION

In the disclosed embodiment of this invention, a galley refrigeration unit is provided on the aircraft to provide cooled air to a food storage galley. An air conditioning pack is provided to supply cooled or heated air to a passenger cabin. A valve associated with the galley refrigeration unit selectively allows cold fluid to pass through a recirculation air heat exchanger. Air is driven over the recirculation air heat exchanger and cooled, and then sent to join with air from the air conditioning pack and delivered to the passenger cabin. The valve is open to direct the cold fluid to the recirculation air heat exchanger when the cooling load for the aircraft passenger cabin has a higher priority than providing additional cooling load to the food storage galley.

At other times, cooling the food storage galley will take precedent over providing cooled air to the passenger cabin. In those cases, the valve will be closed.

A control controls the use of the recirculation air heat exchanger to provide the additional cooled air following an appropriate algorithm.

Since the two units are interrelated, such that the galley refrigeration unit can be utilized to provide cool air to the passenger cabin under certain conditions, the air conditioning pack can be made more compact, as it will be supplemented by the galley refrigeration unit.

The various features and advantages of this invention will become apparent to those skilled in the art from the following detailed description of the currently preferred embodiment. The drawing that accompanies the detailed description can be briefly described as follows.

DETAILED DESCRIPTION OF THE PREFERRED EMBODIMENT

Figure 1:
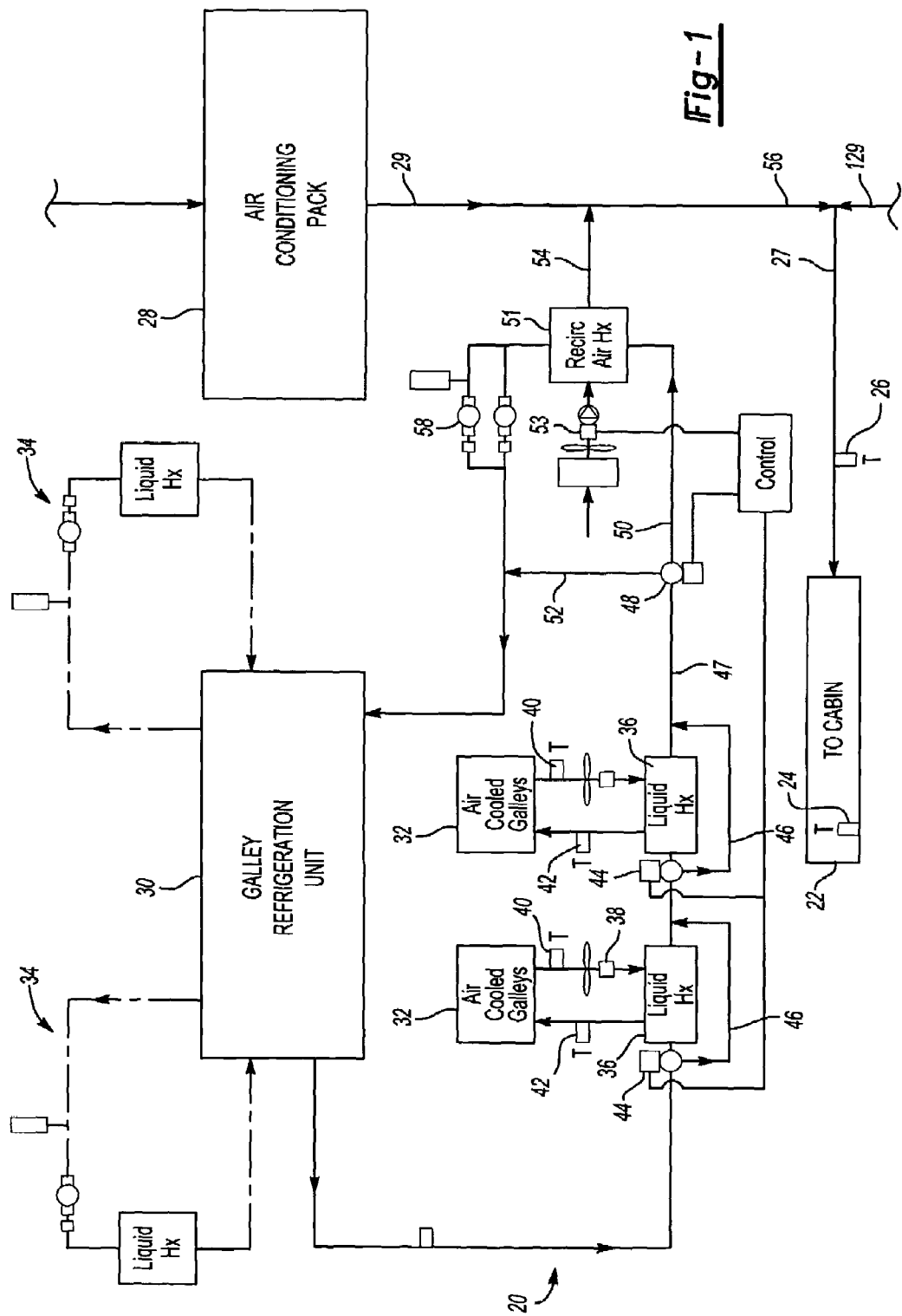
FIG. 1 is a schematic view of a combined galley refrigeration unit and air conditioning pack for an aircraft.

An aircraft cooling system 20 is illustrated in FIG. 1 having two major circuits. First, a cabin 22 is shown having temperature sensors 24 and 26. A supply line 27 sends conditioned air to the cabin 22. As shown, an air conditioning pack 28 either heats or cools the air such that the air is at a desired temperature when it reaches the cabin 22. Feedback from the temperature sensors 24/26 is sent to a control, which can control the air conditioning pack to either increase or decrease the temperature, as necessary. The air passes from the air conditioning pack into a line 29 and downstream to the line 27 leading to the cabin.

A galley refrigeration unit 30 serves to provide cooled air to galleys 32, where food storage trays, etc., are stored. Heat sinks 34 allow heat to be pulled out of the galley refrigeration unit 30. Refrigerant from the galley refrigeration unit 30 is cooled by heat sinks 34, and is used to cool the cold liquid 20. Heat exchangers 36 receive air from fans 38, which then cools the air cooled galleys 32 after having passed over the heat exchangers 36. Temperature sensors 40 and 42 supply air temperature information back to the control. This portion of the galley refrigeration 30 is generally as is known in the prior art. The motors for the fans may be variable speed, again as known in the prior art.

While not shown in this figure, there is typically mirrored circuits of the air conditioning pack 28, and a galley refrigeration unit 30 on an opposed side of the aircraft supplying conditioned air through a line 129 and to other galleys (not shown).

In connection with this invention, bypass valves 44 and bypass lines 46 allow selective bypass of one or both of the heat exchangers 36. In addition, a three-way valve 48 is positioned downstream of a flow line 47, which is downstream of the heat exchangers 36. Three-way valve 48 either connects the line 47 to a supplemental cabin conditioning line 50 or to a return line 52 which returns back to the galley refrigeration unit 30. As shown, a fan 53 selectively drives air over a recirculation heat exchanger 51, with the air passing through path 54 into a line 56, where it joins the conditioned air from the line 29.

The control operates on the basis of an algorithm that determines whether additional cooled air should be supplied by the fan 53 passing over the recirculation heat exchanger 51. If additional cooled air is to be supplied in this manner, the control moves the valve 48 to the position such that cold fluid passes from the line 47 into the line 50. The fan 53 is running continuously. The air now passes over the recirculation air heat exchanger 51 and is cooled before passing into line 54, 56 and 27. Dependent on the amount of cooling load to be supplied by the recirculation air heat exchanger, the valves 44 can also be actuated to bypass the heat exchangers 36. Thus, at times when there is highest priority for cooling capacity at the cabin 22, the heat exchangers 36 may be bypassed entirely, such that all available cooling capacity is supplied to the recirculation air heat exchanger 51.

An algorithm for operating this combined system 20 would generally take temperature information from each of the sensors, and in addition from a sensor providing an indication of ambient temperature.

When the temperature sensors 24 or 26 on the cabin 22 indicate that the cabin temperature is too high or too low, the control controls the air condition pack to adjust this temperature. If the temperature in the cabin 22 is too high, the control may supply additional cooled air by operating the valve 48 and to supply cold fluid to the recirculation heat exchanger 51.

The air cooled galleys must be maintained at a temperature to preserve food. As an example, this temperature is generally approximately 30° F. Initially, when the refrigeration carts are being filled with food trays prior to flight departure, the galley refrigeration unit may be operating at a maximum cooling capacity. At this point, there is a high cooling load on the galley refrigeration unit to bring down the temperature of the air cooled galleys.

Under certain conditions and as for example at this "initial loading" condition, the galley cooling may take priority over providing additional cooling to the passenger cabin. As an example, when the ambient ground temperature is high, it is important to maintain the air cooled galleys 32 at the desired temperature. In addition, there would be a high load on the air conditioning pack to bring down the temperature of the cabin 22. Under these conditions, maintaining the temperature of the air cooled galleys will take precedent over bringing down the cabin temperature. It is considered permissible for the cabin temperature to be slightly higher than its target temperature under these conditions.

Further, during cold conditions, the air conditioning pack 28 is only required to heat the air being delivered to the cabin 22. No recirculation air heat exchanger cooling is desired. Therefore, the galley refrigeration unit need only focus on keeping the air cooled galleys 32 at the desired temperature.

On the other hand, under hot ambient temperature conditions and especially when an aircraft has been sitting idle with all systems off, the aircraft cabin may be initially very hot. It would be desirable to bring the temperature down dramatically prior to loading passengers or food into the aircraft. Both systems may require some cooling at this time, but the higher priority will be given to the recirculating air heat exchanger cooling to initially reduce the cabin temperature.

Once the cabin temperature is sufficiently reduced, the air cooled gallery requirements can then be met. Thus, under these conditions, initially the valves 44 may be opened along with the valve 48 directing cold fluid to the line 50. In this manner, all cold fluid bypasses the heat exchangers 36 and all cooling capacity is passed through the recirculation heat exchanger 51. This will ensure that the temperature of the cabin 22 is brought down as quickly as possible. Once the temperature in the cabin 22 reaches a certain range of the target temperature, the valves 44 may go into a position to pass cold fluid through the heat exchangers 36. In this manner, the air cooled galleys will begin to move towards their target temperature, while cold fluid can continue to pass through the recirculation air heat exchanger. Once the food is loaded, providing cooling capacity to the air cooled galleys may take precedent over providing cold fluid to the recirculation air heat exchanger, and at that point the valve 48 may be turned to move cold fluid through the line 52.

Another instance where priority may be given to providing cooled air to the cabin may occur when systems have failed on the aircraft. As an example, if there is a loss of some power on the aircraft, there may be a limited amount of power available to power the galley refrigeration unit 30 and the air conditioning pack 28. Under such circumstances, the algorithm may give precedent to supplying additional cooled air to the cabin.

An algorithm can be developed by a worker of ordinary skill in the art to be programmed into the control to achieve the assignment of precedent and the control of the components along the lines outlined above. Of course, other ways of sharing the cooling load between the galley refrigeration unit and the air conditioning pack may come within the scope of this invention. As an example, the air conditioning pack may supplement the galley refrigeration unit.

The invention has been disclosed in a preferred embodiment. However, one of ordinary skill in the art would recognize that certain modifications come within the scope of this invention. For that reason, the following claims should be studied to determine the true scope and content of this invention.

What is claimed is:

1. A system for providing cooling in an aircraft comprising:
   a galley refrigeration unit for providing cooled air into a food storage galley, the galley refrigeration unit including a cold fluid circuit for passing a cold fluid through a galley heat exchanger, and for passing a second fluid over said galley heat exchanger such that said second fluid is cooled, and may then be passed into the food storage galley;
   an air conditioning pack for providing conditioned air into a passenger cabin of an aircraft, said air conditioning pack operable to heat or cool air as is desired to meet a target temperature in the passenger cabin; and
   a recirculation air heat exchanger in said cold fluid circuit of said galley refrigeration unit, and a control for selectively providing additional cooled air having passed over said recirculation air heat exchanger to supplement cool air supplied by said air conditioning pack to said passenger cabin.

2. The system as set forth in claim 1, wherein a three-way valve selectively directs cold fluid into said recirculation air heat exchanger, or into a return line based upon a control algorithm.

3. The system as set forth in claim 1, wherein a fan selectively drives air over said recirculation air heat exchanger when additional cooled air is desired to supplement said air conditioning pack.

4. The system as set forth in claim 1, wherein a valve allows selective bypass of cold fluid around said galley heat exchanger when a cooling load on the passenger cabin is deemed to take precedent over the cooling load of the food storage galley.

5. The system as set forth in claim 1, wherein said control gives precedent to cooling said food storage galley, and not providing supplemental cooling air when food is initially stored in said food storage galley.

6. The system as set forth in claim 1, wherein said control gives precedent to passing cold fluid through said recirculation air heat exchanger to supplement said cooled air supplied by said air conditioning pack before passengers and food are loaded onto the aircraft.

7. The system as set forth in claim 1, wherein said control gives precedent to passing cold fluid through said recirculation air heat exchanger to supplement said cooled air supplied by said air conditioning pack if there is a limited amount of power available to the galley refrigeration unit and the air conditioning pack.

8. The system as set forth in claim 1, wherein said second fluid is air.

9. A method of providing cooling in an aircraft comprising:
   providing a galley refrigeration unit providing cooled air into a food storage galley, the galley refrigeration unit including a cold fluid circuit passing a cold fluid through a galley heat exchanger, and passing a second fluid over said galley heat exchanger such that said second fluid is cooled, and is then passed into the food storage galley;

providing an air conditioning pack providing conditioned air into a passenger cabin of an aircraft, said air conditioning pack operable to heat or cool air as is desired to meet a target temperature in the passenger cabin; and providing a recirculation air heat exchanger in said cold fluid circuit of said galley refrigeration unit, and selectively providing additional cooled air having passed over said recirculation air heat exchanger to supplement cool air supplied by said air conditioning pack to said passenger cabin.

10. The method as set forth in claim 9, wherein a three-way valve is moved to selectively direct cold fluid into said recirculation air heat exchanger, or into a return line.

11. The method as set forth in claim 9, wherein a fan drives air over said recirculation air heat exchanger when additional cooled air is desired to supplement said air conditioning pack.

12. The method as set forth in claim 9, wherein a valve is moved to bypass cold fluid around said galley heat exchanger when a cooling load on the passenger cabin is deemed to take precedent over the cooling load of the food storage galley.

13. The method as set forth in claim 9, wherein a control gives precedent to cooling said air cooled galleys, and not providing supplemental cooled air when food is initially stored in said food storage galley.

14. The method as set forth in claim 9, wherein a control gives precedent to passing cold fluid through said recirculation air heat exchanger to supplement said cooled air supplied by said air conditioning pack before passengers and food are loaded onto the aircraft.

15. The method as set forth in claim 9, wherein a control gives precedent to passing cold fluid through said recirculation air heat exchanger to supplement said cooled air supplied by said air conditioning pack if there is a limited amount of power available to the galley refrigeration unit and the air conditioning pack.

16. The method as set forth in claim 9, wherein said second fluid is air.

* * * * *

UNITED STATES PATENT AND TRADEMARK OFFICE
CERTIFICATE OF CORRECTION

PATENT NO. : 7,380,408 B2
APPLICATION NO. : 11/312137
DATED : June 3, 2008
INVENTOR(S) : Zywiak et al.

It is certified that error appears in the above-identified patent and that said Letters Patent is hereby corrected as shown below:

On the title page, item [73]:

The Assignee should read as follows:

(73) Assignee: Hamilton Sunstrand Corporation, Windsor Locks, CT (US)

Signed and Sealed this

Twenty-fifth Day of August, 2009

David J. Kappos
*Director of the United States Patent and Trademark Office*